(12) United States Patent
Sarkisian et al.

(10) Patent No.: US 8,857,963 B2
(45) Date of Patent: Oct. 14, 2014

(54) INKS AND INK SETS FOR IMPROVED PERFORMANCE AND IMAGE QUALITY

(75) Inventors: George Sarkisian, San Diego, CA (US); Keshava A. Prasad, San Marcos, CA (US); Heng Siong Low, Singapore (SG)

(73) Assignee: Hewlett-Packard Development Company, L.P., Houston, TX (US)

( * ) Notice: Subject to any disclaimer, the term of this patent is extended or adjusted under 35 U.S.C. 154(b) by 1001 days.

(21) Appl. No.: 12/990,149

(22) PCT Filed: Apr. 29, 2008

(86) PCT No.: PCT/US2008/061898
§ 371 (c)(1),
(2), (4) Date: Oct. 28, 2010

(87) PCT Pub. No.: WO2009/134247
PCT Pub. Date: Nov. 5, 2009

(65) Prior Publication Data
US 2013/0286081 A1    Oct. 31, 2013

(51) Int. Cl.
*C09D 11/00* (2014.01)
*B41J 2/14* (2006.01)
*C09D 11/322* (2014.01)
*C09D 11/40* (2014.01)
*C09D 11/328* (2014.01)

(52) U.S. Cl.
CPC .......... *C09D 11/322* (2013.01); *B41J 2/14016* (2013.01); *C09D 11/40* (2013.01); *C09D 11/328* (2013.01)
USPC ........................................ 347/100

(58) Field of Classification Search
USPC ........................................ 347/100
See application file for complete search history.

(56) References Cited

U.S. PATENT DOCUMENTS

| | | |
|---|---|---|
| 4,791,435 A | 12/1988 | Smith et al. |
| 5,356,464 A | 10/1994 | Hickman |
| 5,714,989 A | 2/1998 | Wade |
| 5,992,979 A | 11/1999 | Barbour et al. |
| 6,193,347 B1 | 2/2001 | Askeland et al. |
| 6,616,273 B1 | 9/2003 | Bruinsma |
| 6,964,700 B2 | 11/2005 | Uji et al. |
| 7,074,265 B2 | 7/2006 | Ikesu et al. |
| 7,074,267 B2 | 7/2006 | Coughlin et al. |
| 7,204,872 B2 | 4/2007 | Uhlir-Tsang |
| 7,250,078 B2 | 7/2007 | Iijima et al. |
| 7,265,165 B2 | 9/2007 | Ohkubo et al. |
| 2003/0127020 A1* | 7/2003 | Smith et al. ................. 106/31.58 |
| 2003/0199613 A1 | 10/2003 | Ninomiya et al. |
| 2006/0092252 A1 | 5/2006 | Wickramanayake |
| 2006/0139426 A1 | 6/2006 | Doi |
| 2006/0170745 A1 | 8/2006 | Deroover et al. |
| 2006/0176349 A1 | 8/2006 | Nagai et al. |
| 2006/0268084 A1 | 11/2006 | Nishizaki et al. |
| 2007/0120928 A1* | 5/2007 | Ma et al. ........................ 347/100 |
| 2007/0139501 A1 | 6/2007 | Sekiguchi |
| 2007/0165086 A1 | 7/2007 | Sekiguchi et al. |
| 2007/0181037 A1 | 8/2007 | Vasudevan |
| 2007/0216742 A1* | 9/2007 | Sarkisian et al. ............. 347/100 |
| 2007/0279444 A1* | 12/2007 | Hayashi et al. .................. 347/17 |
| 2008/0257203 A1* | 10/2008 | Choy et al. ................. 106/31.13 |

FOREIGN PATENT DOCUMENTS

| | | |
|---|---|---|
| EP | 0373894 | 6/1990 |
| EP | 0885940 | 6/1998 |
| EP | 1342759 | 9/2003 |

OTHER PUBLICATIONS

European Search Report dated Jan. 31, 2014 for Applicant Hewlett-Packard Development Company, L.P., Reference 200702632-2.

* cited by examiner

Primary Examiner — Laura Martin

(57) ABSTRACT

Ink sets can include a plurality of aqueous inks. In one embodiment, a first ink can include a magenta dye and a magenta pigment. A second ink can include a cyan pigment, and a third ink can include a yellow pigment, wherein the second and third inks are substantially devoid of dye. The inks can independently include 2-pyrrolidone or 2-hydroxyethyl-2-pyrrolidone and an additional solvent selected from a glycol, a second pyrrolidone, and mixtures thereof. In another embodiment, an aqueous ink-jet ink can comprise a pigment and a liquid vehicle including water, 2-pyrrolidone, 2-hydroxyethyl-2-pyrrolidone, tetraethylene glycol, and 1,6-hexanediol.

14 Claims, No Drawings

INKS AND INK SETS FOR IMPROVED PERFORMANCE AND IMAGE QUALITY

BACKGROUND

Many desirable ink qualities have inverse relationships. For example, additional latex can be added to an ink to improve waterfastness, however, such addition can have the undesirable effect of impairing the equipment used to transmit the ink to a media substrate. Likewise, high levels of color saturation can be obtained through use of dyes. Unfortunately, dye-based inks generally have poor water fastness and/or poor highlighter smear compared to pigment-based inks. Therefore, as the market continues to grow and develop, there is a need to develop inks and ink sets that are capable of providing improved ink-jet printhead performance, performance on media, as well as image quality.

DETAILED DESCRIPTION

Reference will now be made to the exemplary embodiments of the present invention, both those described and those illustrated in the drawing, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

In describing and claiming the present invention, the following terminology will be used.

The singular forms "a," "an," and "the" include plural referents unless the context clearly dictates otherwise. Thus, for example, reference to "a colorant" includes reference to one or more colorants.

As used herein, "vehicle," "liquid vehicle," or "ink vehicle" refers to the liquid fluid in which colorant is placed to form an ink. Liquid vehicles are well known in the art, and a wide variety of liquid vehicles may be used in accordance with embodiments of the present invention. As discussed herein, such ink vehicles may include a mixture of a variety of different agents, including without limitation, solvents, co-solvents, latex, buffers, biocides, viscosity modifiers, sequestering agents, stabilizing agents, and water. The liquid vehicle can also carry other additives such as other polymers, UV curable materials, and/or plasticizers, in some embodiments. It is noted that if a colorant, e.g., dye and/or pigment, is present in liquid vehicle, the solution or dispersion.

The term "colorant" can include dyes, pigments, and/or other particulates that may be suspended or solvated in a liquid vehicle in accordance with embodiments of the present invention. Dyes are typically water soluble and pigments are typically not water soluble. Some dyes, however, have limited solubility and are known as slightly-soluble dyes, or insoluble dyes, as is known in the art. Accordingly, slightly-soluble dyes are dyes having 5 wt % or less solubility in water. Insoluble dyes are those having 1.0% wt % or less solubility in water.

It should be noted that the term "multi-color image" as used herein refers to not only an image having two or more colors, but also an image including black and a single color.

As used herein, "decap" refers to the tendency of ink-jet inks to crust near the jetting orifice at an ink-jet printhead due to the evaporation of solvents present in the ink. Ink-jet inks that exhibit good decap do not require the extensive use of a capping mechanism designed to prevent this type of crusting (as is the case with many ink-jet inks) over reasonable periods of time, e.g., several weeks or more. Decap is typically evaluated by printing the ink with an ink-jet printer. The printer is allowed to rest for increasing intervals of time. Typically, the intervals increase by a second or more. The number of ink ejections required to obtain a distinct and complete line is recorded. The longer the interval of time between firings of the ink-jet printhead while still being able to generate complete printed line (with a reasonable number of firings), the better the decap.

The term, "curl" refers to the tendency of edges of a media, once coated with an ink, to move from a planar position with respect to the overall media, to a more three-dimensional shape. Specifically, the edges, and most particularly, the corners of a square or rectangular media, such as a paper, curl and no longer remain flat. To measure curl, typically, a media sheet, such as paper, is printed on with ink and placed on a flat horizontal surface. The distance between the four corners of the media and the horizontal flat surface are measured at 24 hour and/or 72 hour intervals and these four (corner) distances are averaged to determine the amount of curl. A lower number is generally understood to be more acceptable with respect to curl.

As used herein, "plurality" refers to more than one. For example, a plurality of inks refers to at least two inks.

As used herein, "waterfastness" refers to the resistance of a print to deterioration in the form of spearing or other ink migration in the presence of water or a water-based fluid. Drip testing is one method of evaluating waterfastness. For such measurements, an image including a sequence of parallel lines is formed and subjected to a water drop on one edge. The image is held at a given angle (e.g., 45°) until the water has absorbed into the media of the image, or until the water runs off of the media. From there, the optical density of the drip line (if any), compared to the optical density of the paper is determined and reported in optical density units or mODs. Such determination can be done visibly, or with the assistance of measurement equipment, such as an x-ray spectrophotometer. Generally, an ideal drip measurement is zero, and tolerances are created for inks from there. As good drip values translate to good waterfastness, and a value of less than about 30 mOD units is often considered good drip. Typically, dye-based inks are more susceptible to higher drip measurements than pigment-based inks. Further, uncoated dye-based inks, generally have higher drip measurement than dye-based inks having a latex-type coating, or compared to those printed with a fixer.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

The term "fluid" does not require that all components in the composition be liquid, as pigments are typically dispersed in the color-containing fluid. Thus, fluid dispersions and fluid solutions are both included as colorant-containing fluids.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

According to various aspects of the present invention, an ink-jet ink set, including a plurality of inks, can be formulated to provide a printed image having good printed image quality, such as good water-fastness, good color saturation and bleed, and good performance in an ink-jet printhead. In one aspect, a specific set of solvents can be used to improve the qualities of the ink-set and resulting printed image. Such ink-sets can be configured for use with a thermal ink-jet printhead.

In accordance with the difficulties outlined above, various details are provided herein which are applicable to each of the ink-jet ink or inks, ink-jet ink set, method of printing an image, etc. Thus, discussion of one specific embodiment is related to and provides support for this discussion in the context of the other related embodiments.

In one aspect, an ink-jet ink set can include multiple aqueous inks, e.g., typically cyan, magenta, and yellow, and optionally black, light cyan, light magenta, and/or other colors. In one embodiment, the first ink can include a magenta dye and a magenta pigment. The second ink can include a cyan pigment, and the third ink can include a yellow pigment. The second and third inks can be substantially free of dyes. In a further aspect, all inks in the ink set can be substantially free of dyes except for the magenta dye included with the magenta pigment in the first ink. These inks can be aqueous inks in one embodiment. Further, each of the inks in the ink set can independently include at least two organic solvents. In one aspect, each of the inks can include 2-pyrrolidone or derivative thereof. Another solvent for each ink can be independently selected from a glycol or another type of pyrrolidone. In a further embodiment, each of the inks in the ink set can include two or even three additional solvents independently selected from glycols, additional pyrrolidones, and mixtures thereof, e.g., two or three glycols, two or three additional pyrrolidones, one or two glycols and one or two pyrrolidones, etc. In one embodiment, ink-jet ink set as disclosed herein can be configured to provide good waterfastness without the need of a fixer in the ink set. Specifically, the pigment-containing inks used in combination with the solvent combinations set forth herein provide acceptable waterfastness, as measured in accordance with the waterfastness protocols described herein, even when no fixer is used. This can be significant because ink sets that can print on various types of media with little or no drip, bleed, feathering, etc., without the need of a fixer, provides ink sets that are simpler, often more cost effective, and which avoid the possibility of printhead cross-contamination caused by normal printing procedures.

In another aspect, a method of printing a multi-color image can comprise warming a first ink with a precursor pulse and ejecting the first ink with a thermal ink-jet pen onto a media substrate, and warming a second ink with a precursor pulse and ejecting the second ink with the thermal ink-jet pen onto the media substrate. The first ink-jet ink can be substantially free of dye and include a non-magenta pigment, 2-pyrrolidone, and an additional solvent selected from a glycol, a second pyrrolidone, and mixtures thereof. The second ink can include a magenta dye and a magenta pigment, 2-pyrrolidone, and an additional solvent selected from a glycol, a second pyrrolidone, and mixtures thereof.

In another embodiment, an aqueous ink-jet ink can comprise a pigment and a liquid vehicle including water, 2-pyrrolidone, 2-hydroxyethyl-2-pyrrolidone, tetraethylene glycol, and 1,6-hexanediol.

These and other embodiments include certain commonalities that are relevant to the ink set, method, ink-jet ink, etc., and thus, discussion of one embodiment provides information that is relevant to other embodiments.

Pigments that can be used include any pigment that can be configured to provide the acceptable waterfastness. Such pigments include, but are not limited to self-dispersed pigments and more standard pigments that are dispersed with a separate dispersing agent. Examples of self dispersed pigments include those with covalently attached small molecules as well as polymer-attached pigments. In a specific aspect, one of the inks in the ink set can include polymer-attached pigment. In a further aspect, a plurality of inks in the ink set can include polymer-attached pigment. In still a further aspect, all of the inks in the ink set can include polymer-attached pigment. Optionally, all of the pigments included in the inks of the ink set can be the polymer-attached pigment type. With all pigments, including black pigment, each pigment type can alternatively comprise or consist essentially of small-molecule attached pigment. Mixing of polymer-attached pigments in certain inks and small molecule-attached pigments in other inks is also acceptable. Small molecule-attached pigments include a single molecule covalently bound to a pigment. Small molecule-attached pigments do not include polymeric structures attached to the pigment. Such pigments, are commercially available from, e.g., Cabot Corp and DuPont. Alternatively, polymer-attached pigments include polymer or repeating monomer attached or physically-absorbed by grinding to the pigment surface. Such pigments, are commercially available from, e.g., Cabot Corp., Sensient, Dianippon, and Fuji Film Imaging Colorants. Furthermore, pigments utilized in the present application can include black or color pigments. Color pigments can include cyan, magenta, yellow, purple, red, orange, green, pink, or any other non-black pigment available.

In one aspect, the ink-set can be completely substantially free of dyes. In another aspect, one or more inks of the ink set can include a dye, e.g., magenta ink can include a magenta pigment and a magenta dye. In one embodiment, magenta dye is included in a magenta ink or light magenta ink, along with magenta pigment. The magenta dye, when used, can be of the insoluble or slightly soluble class of dyes. In one specific embodiment, the magenta dye can be slightly soluble, as determined by having solubility in water of less than 5 wt %. A non-limiting example of a slightly-soluble dye includes carboxy-dyes. Typically, dye solubility can be dependant on the number of carboxy groups versus the number of sulfonate groups. The more sulfonate groups indicates a greater solubility. For example, a dye molecule can include four or more sulfonate groups. Replacing one or more of these groups with carboxy groups reduces the water solubility of the dye molecule. In a specific embodiment, the magenta dye can comprise or consist essentially of carboxy-dye. Otherwise, more traditional water soluble dyes can be used.

Classes of organic solvents that can be used include aliphatic alcohols, aromatic alcohols, glycols, glycol ethers, polyglycol ethers, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologues of polyethylene glycol alkyl ethers, N-alkyl caprolactams, unsubstituted caprolactams, both substituted and unsubstituted formamides, both substituted and unsubstituted acetamides, and the like. In one aspect, one or more inks of the ink set can include a plurality of organic solvents. In a further aspect, the plurality of organic solvents can include one or more of glycols and/or pyrrolidones. Non-limiting examples of glycols and pyrrolidones that can be used according to the present disclosure include 2-pyrrolidone, 2-hydroxyethyl-2-pyrrolidone, 2-hydroxyethyl-2-imidazolidone, tetraethylene glycol, tripropylene glycol, 1,6-hexanediol, and combinations thereof. Each of the inks of an ink set can independently include solvents selected from glycols, pyrrolidones, and combinations thereof. Such inks can independently include one, two, three, four or more of the organic solvents selected from glycols, pyrrolidones, and combinations thereof. In a specific embodiment, one ink, a plurality of inks, or all inks of an ink-set can include 2-pyrrolidone. In another embodiment, one ink, a plurality of inks, or all inks of an ink-set can include 2-hydroxyethyl-2-pyrrolidone. In still another embodiment, one, a plurality of inks, or all inks of an ink-set can include at least four solvents independently selected or each containing solvents selected from the group consisting of 2-pyrrolidone, 2-hydroxyethyl-2-pyrrolidone, 2-hydroxyethyl-2-imidazolidone, tetraethylene glycol, tripropylene glycol, 1,6-hexanediol, and combinations thereof.

The amount of organic solvent present in the aqueous inks can affect the viscosity of the inks. The fluidic architecture of an inkjet printhead is typically optimized around various ink properties including ink viscosity to facilitate proper ink flow in an ink cartridge and proper drop generation. As such, in one aspect, the total amount of organic solvent included in an ink can be less than 30 wt %. In a further embodiment, the total amount of organic solvent (including glycols and pyrrolidones) can range from about 15 wt % to about 25 wt %. In a specific embodiment, when solvents include 2-pyrrolidone, 2-hydroxyethyl-2-pyrrolidone, tetraethylene glycol, and 1,6-hexanediol, their collective solvent concentration can be from about 15 wt % to about 25 wt %, or form about 19 wt % to about 23 wt %. Depending on the fluidic architecture used, the allowable viscosity can vary greatly, and thus, it has been recognized that by using certain solvents in combination, as described herein, acceptable jetting characteristics can be achieved, while achieving acceptable image quality, decap performance, and curl reduction. Furthermore, it is noted that for certain fluidic architecture, it can be desirable that the inks be formulated to have a viscosity of less than about 4.2 cPs. Additionally, to improve the appearance and performance of an image printed with an ink set as disclosed herein, a plurality of the inks, or in some cases, all of the inks of the ink set can be configured to have similar viscosity measurements. In a specific aspect, the ratio of the viscosity of a first ink to the viscosity of a second ink of an ink set can be from about 0.8 to about 1.2, e.g., viscosity of black ink to a color ink. Furthermore, the inks of an ink set can be configured for use in a thermal ink-jet printhead.

Ink sets of the present disclosure can include two, three, four, or more inks. As mentioned, the inks can be aqueous and can include one or more solvents selected from glycols, pyrrolidones, and mixtures thereof. In one specific aspect, an ink set can include one ink including black pigment, and two, three, or more inks including color pigments. One or more of the solvent systems of the inks can each independently include any combination of organic solvents, e.g. 2-pyrrolidone, 2-hydroxyethyl-2-pyrrolidone, 2-hydroxythyl-2-imidazolidone, tetraethylene glycol, tripropylene glycol, 1,6-hexanediol, and combinations thereof.

In specific embodiments where a combination of 2-pyrrolidone, 2-hydroxyethyl-2-pyrrolidone, tetraethylene glycol, and 1,6-hexanediol are used, it is noted that these co-solvents are particularly useful in combination because of their specific characteristics when used in combination. For example, these solvents have a relatively low vapor pressure. The vapor pressure of each of 2-pyrrolidone, 2-hydroxyethyl-2-pyrrolidone, tetraethylene glycol, and 1,6-hexanediol in mmHg is 1.50 E-04, 2.94 E-02, 6.90 E-03, and 1.47 E-05, respectively. The viscosity of each of 2-pyrrolidone, 2-hydroxyethyl-2-pyrrolidone, tetraethylene glycol, and 1,6-hexanediol in cps is 53.4, 13.3, solid at room temperature, and 39.9, respectively, as taken at room temperature. As such, the combination of a solvent system including the four noted co-solvents produces an ink having relatively low viscosity, which results in good compatibility with a variety of ink-jet fluidic architectures and good decap. Further, the relatively low vapor pressure and displacement of water in the formulation results in good, or reduced, curl when printed. It is noted that in one embodiment, in addition to these four solvents, Liponics Ethoxylated Glycerol (LEG-1) or other ethoxylated glycerol ether can be included in the ink-jet ink formulations as well, e.g., at from about 0.1 wt % to about 4 wt %.

The inks utilized in an ink set can each independently include other additives. The ink can include one or more surfactants. Specifically, the ink can include one or more non-ionic, cationic, and/or anionic surfactants, and if present, can be included at from about 0.01 wt % to about 5.0 wt %. One or more of many surfactants can be used as are known by those skilled in the art of ink formulation and may include alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like. Other non-limiting examples of surfactants that can be used include primary, secondary, and tertiary amine salt compounds such as hydrochloric acid salts, acetic acid salts of laurylamine, coconut amine, stearylamine, rosin amine; quaternary ammonium salt type compounds such as lauryltrimethylammonium chloride, cetyltrimethylammonium chloride, benzyltributylammonium chloride, benzalkonium chloride, etc.; pyridinium salt type compounds such as cetylpyridinium chloride, cetylpyridinium bromide, etc.; nonionic surfactant such as polyoxyethylene alkyl ethers, polyoxyethylene alkyl esters, acetylene alcohols, acetylene glycols; and other surfactants such as dihydroxyethylstearylamine, stearyldimethylbetaine, lauryldihydroxyethylbetaine, and fluorosurfactants; and combinations thereof.

Consistent with the formulation of this invention, various other additives may be employed to optimize the properties of the ink composition for specific applications. Examples of these additives are those added to inhibit the growth of harmful microorganisms. These additives may be biocides, fungicides, and other microbial agents, which are routinely used in ink formulations. Examples of suitable microbial agents include, but are not limited to, Nuosept™, Ucarcide™, Vancide™, Proxel™, and combinations thereof.

Sequestering agents such as EDTA (ethylene diamine tetra acetic acid) may be included to eliminate the deleterious effects of heavy metal impurities, and buffer solutions may be used to control the pH of the ink. From 0.001% to 2.0% by weight, for example, of either of these components can be used. Viscosity modifiers and buffers may also be present, as well as other additives known to those skilled in the art to modify properties of one or more inks of an ink set as desired. Such additives can be present at from, e.g., 0.01% to 20% by weight.

Additionally, one or more inks can comprise humectants. Humectants can be present to enhance the longevity of solution and solubility characteristics, which can be maintained by retention of moisture within the ink. Examples of humectants include, but are not limited to, nitrogen-containing compounds such as urea, thiourea, ethylene urea, alkylurea, alkylthiourea, dialkylurea, dialkylthiourea; sugars such as 1-deoxy-D-galactitol, mannitol, and inositol, and combinations thereof.

The inks can also comprise solution characteristic modifiers such as viscosity modifiers, pH adjusters, preservatives, various types of antioxidants, and evaporation accelerators. pH adjustors that can be used comprise base agents such as sodium hydroxide, lithium hydroxide, sodium carbonate, ammonium carbonate ammonia sodium acetate, ammonium acetate, morpholine, monoethanolamine, diethanolamine, triethanolamine, ethylmonoethanolamine, n-butyldiethanolamine, di-n-butylethanolamine, monoisopropanolamine, diisopropanolamine, and triisopropanolamine, and the like as well as combinations thereof. Additionally, pH adjustors can also comprise acidic agents that can be selected from the list of acidic crashing agents.

Additionally, solids (either dissolved in the ink(s) or dispersed therein) can also be present in the formulations of the present invention, and can include binders, latex particulates, plasticizers, etc.

Regarding the other additives that can be included in the ink formulations, it is understood that the enumerated components are exemplary and do not limit the scope of vehicle components that can be used. The balance of any embodiment formulation can be purified water, or other vehicle component known in the art.

It follows, then, that a method of printing a multi-color image can include utilizing the ink sets disclosed herein, along with multiple ink-jet printheads, to form an image on a media. In one aspect, the ink-jet printhead can be a thermal ink-jet printhead. In a particular embodiment, the ink-jet printhead can be configured to provide a precursor pulse to warm an ink prior to ejecting the ink from the ink-jet printhead. Specifically, a method of printing a multi-color image can include warming a first ink with a precursor pulse and ejecting the first ink from a first thermal ink-jet pen onto a media, and likewise warming a second ink with a precursor pulse and ejecting the second ink from a second thermal ink-jet pen onto a media. The precursor pulse can be optimized within the method to improve pen decap. As noted, decap relates to the ability of the pen to remain uncapped, in between uses. In a specific embodiment, the precursor pulse can be set to a temperature from about 35° C. to about 65° C.

Consistent with ink sets disclosed herein which include more than two inks, the method can include warming a third, fourth, etc., ink with a precursor pulse and ejecting each ink, respectively, from each respective ink-jet pen onto the media.

Media substrates can be any base material that can be plain or coated and is configured to receive ink in accordance with an embodiment of the present invention. A non-limiting example of a media substrate is paper. Such paper or other media substrates can be coated substrates, such as polymeric coated substrates, swellable media, or micro-porous media. In the example of paper, the paper can in some embodiments be photo paper and/or brochure media, and can have a surface finish such as gloss, matte, or semi-gloss.

The ink sets and methods disclosed herein, particularly the use of the multiple organic solvents, pigments, magenta dye, optionally precursor pulse, increase color saturation without sacrificing waterfastness. The ink vehicles can be optimized to minimize black to color bleed, as well as reduce white spots in area fill when mixing black with color. The ink sets can provide the superior waterfastness and other qualities without the requirement of the use of a fixer composition.

EXAMPLES

The following examples illustrate embodiments of the invention that are presently known. Thus, these examples should not be considered as limitations of the present invention, but are merely in place to teach how to make the best-known compositions of the present invention based upon current experimental data. As such, a representative number of compositions and their method of manufacture are disclosed herein.

Example 1

Ink Set 1

An ink set, including Cyan, Magenta, and Yellow inks, includes components as outlined in Table 1.

TABLE 1

| Ingredients | Magenta Ink | Cyan Ink | Yellow Ink |
| --- | --- | --- | --- |
| Pigment (polymer-attached)* | 3-6 wt % | 1-4 wt % | 2-5 wt % |
| Magenta Dye** | 0.1-2 wt % | 0 | 0 |
| Surfactant | 0.01-2 wt % | 0.01-2 wt % | 0.01-2 wt % |
| 2-Hydroxyethyl-2-pyrrolidone | 5-10 wt % | 5-10 wt % | 5-10 wt % |
| 2-pyrrolidone | 5-10 wt % | 5-10 wt % | 5-10 wt % |
| 1,6-Hexanediol | 1-6 wt % | 1-6 wt % | 1-6 wt % |
| Tetraethylene Glycol | 1-6 wt % | 1-6 wt % | 1-6 wt % |
| LEG-1 | 0.1-4 wt % | 0.1-4 wt % | 0.1-4 wt % |
| Emulsifier | 0.1-3 wt % | 0.1-3 wt % | 0.1-3 wt % |
| Water | balance | balance | balance |

*Pigment color, i.e. magenta ink includes magenta pigment, etc.
**Magenta Dye is carboxy-dye, which is a slightly soluble dye.

Example 2

Ink Set 2

An ink set, including Cyan, Magenta, and Yellow inks includes components as outlined in Table 2.

TABLE 2

| Ingredients | Magenta Ink | Cyan Ink | Yellow Ink |
| --- | --- | --- | --- |
| Pigment (polymer-attached)* | 3-6 wt % | 1-4 wt % | 2-5 wt % |
| Magenta Dye** | 0.1-2 wt % | 0 | 0 |
| Surfactant | 0.2-2 wt % | 0.2-2 wt % | 0.2-2 wt % |
| 2-Hydroxyethyl-2-pyrrolidone | 4-9 wt % | 4-9 wt % | 4-9 wt % |
| 2-pyrrolidone | 3-9 wt % | 3-9 wt % | 3-9 wt % |
| 1,6-Hexanediol | 3-8 wt % | 3-8 wt % | 3-8 wt % |
| Tetraethylene Glycol | 3-8 wt % | 3-8 wt % | 3-8 wt % |
| LEG-1 | 0.1-4 wt % | 0.1-4 wt % | 0.1-4 wt % |
| Emulsifier | 0.1-3 wt % | 0.1-3 wt % | 0.1-3 wt % |
| Water | balance | balance | balance |

*Pigment color, i.e. magenta ink includes magenta pigment, etc.
**Magenta Dye is carboxy-dye, which is a slightly soluble dye.

Example 3

Ink Set 3

An ink set, including Cyan, Magenta, and Yellow inks includes components as outlined in Table 3.

TABLE 3

| Ingredients | Magenta Ink | Cyan Ink | Yellow Ink |
| --- | --- | --- | --- |
| Pigment (polymer-attached)* | 3-6 wt % | 1-4 wt % | 2-5 wt % |
| Magenta Dye** | 0.1-2 wt % | 0 | 0 |
| Surfactant | 0.2-2 wt % | 0.2-2 wt % | 0.2-2 wt % |
| 2-Hydroxyethyl-2-pyrrolidone | 6-12 wt % | 6-12 wt % | 6-12 wt % |
| 2-pyrrolidone | 3-8 wt % | 3-8 wt % | 3-8 wt % |
| 1,6-Hexanediol | 6-12 wt % | 6-12 wt % | 6-12 wt % |
| LEG-1 | 0.1-4 wt % | 0.1-4 wt % | 0.1-4 wt % |
| Emulsifier | 0.1-3 wt % | 0.1-3 wt % | 0.1-3 wt % |
| Water | balance | balance | balance |

*Pigment color, i.e. magenta ink includes magenta pigment, etc.
**Magenta Dye is carboxy-dye, which is a slightly soluble dye.

Example 4

Ink Set 4

An ink set, including Cyan, Magenta, Yellow, and Black inks includes components as outlined in Table 4.

TABLE 4

| Ingredients | Black Ink | Magenta Ink | Cyan Ink | Yellow Ink |
| --- | --- | --- | --- | --- |
| Pigment* | 3-6 wt % | 3-6 wt % | 1-4 wt % | 2-5 wt % |
| Magenta Dye** | 0 | 0.1-2 wt % | 0 | 0 |
| Surfactant | 0.01-1.5 wt % | 0.2-2 wt % | 0.2-2 wt % | 0.2-2 wt % |
| 2-Hydroxyethyl-2-pyrrolidone | 0 | 5-10 wt % | 5-10 wt % | 5-10 wt % |
| 2-pyrrolidone | 13-20 wt % | 5-10 wt % | 5-10 wt % | 5-10 wt % |
| 1,6-Hexanediol | 0 | 1-6 wt % | 1-6 wt % | 1-6 wt % |
| Tetraethylene Glycol | 2-7 wt % | 1-6 wt % | 1-6 wt % | 1-6 wt % |
| LEG-1 | 0.1-4 wt % | 0.1-4 wt % | 0.1-4 wt % | 0.1-4 wt % |
| Emulsifier | 0 | 0.1-3 wt % | 0.1-3 wt % | 0.1-3 wt % |
| Water | balance | balance | balance | balance |

*Pigment of color of ink, i.e. magenta ink includes magenta pigment. Black pigment is small-molecule attached black pigment. All others are polymer-attached pigment with identified colors.
**Magenta Dye is carboxy-dye, which is a slightly soluble dye.

Example 5

Ink Set 5

An ink set, including Cyan, Magenta, Yellow, and Black inks includes components as outlined in Table 5.

TABLE 5

| Ingredients | Black Ink | Magenta Ink | Cyan Ink | Yellow Ink |
| --- | --- | --- | --- | --- |
| Pigment* | 3-6 wt % | 3-6 wt % | 1-4 wt % | 2-5 wt % |
| Magenta Dye** | 0 | 0.1-2 wt % | 0 | 0 |
| Surfactant | 0.01-1.5 wt % | 0.2-2 wt % | 0.2-2 wt % | 0.2-2 wt % |
| 2-Hydroxyethyl-2-pyrrolidone | 0 | 3-9 wt % | 3-9 wt % | 3-9 wt % |
| 2-pyrrolidone | 13-20 wt % | 3-9 wt % | 3-9 wt % | 3-9 wt % |
| 1,6-Hexanediol | 0 | 3-8 wt % | 3-8 wt % | 3-8 wt % |

TABLE 5-continued

| Ingredients | Black Ink | Magenta Ink | Cyan Ink | Yellow Ink |
|---|---|---|---|---|
| Tetraethylene Glycol | 2-7 wt % | 3-8 wt % | 3-8 wt % | 3-8 wt % |
| LEG-1 | 0.1-4 wt % | 0.1-4 wt % | 0.1-4 wt % | 0.1-4 wt % |
| Emulsifier | 0 | 0.1-3 wt % | 0.1-3 wt % | 0.1-3 wt % |
| Water | balance | balance | balance | balance |

*Pigment of color of ink i.e. magenta ink includes magenta pigment. Black pigment is small-molecule attached black pigment. All others are polymer-attached pigment with identified colors.
**Magenta Dye is carboxy-dye, which is a slightly soluble dye.

Example 6

Ink Set 6

An ink set, including Cyan, Magenta, Yellow, and Black inks includes components as outlined in Table 6.

TABLE 6

| Ingredients | Black Ink | Magenta Ink | Cyan Ink | Yellow Ink |
|---|---|---|---|---|
| Pigment* | 3-6 wt % | 3-6 wt % | 1-4 wt % | 2-5 wt % |
| Magenta Dye** | 0 | 0.1-2 wt % | 0 | 0 |
| Surfactant | 0.01-1.5 wt % | 0.2-2 wt % | 0.2-2 wt % | 0.2-2 wt % |
| 2-Hydroxyethyl-2-pyrrolidone | 0 | 6-12 wt % | 6-12 wt % | 6-12 wt % |
| 2-pyrrolidone | 13-20 wt % | 3-8 wt % | 3-8 wt % | 3-8 wt % |
| 1,6-Hexanediol | 0 | 6-12 wt % | 6-12 wt % | 6-12 wt % |
| Tetraethylene Glycol | 2-7 wt % | 0 | 0 | 0 |
| LEG-1 | 0.1-4 wt % | 0.1-4 wt % | 0.1-4 wt % | 0.1-4 wt % |
| Emulsifier | 0 | 0.1-3 wt % | 0.1-3 wt % | 0.1-3 wt % |
| Water | balance | balance | balance | balance |

*Pigment of color of ink, i.e. magenta ink includes magenta pigment. Black pigment is small-molecule attached black pigment. All others are polymer-attached pigment with identified colors.
**Magenta Dye is carboxy-dye, which is a slightly soluble dye.

Example 7

Performance Results for Example 1 Ink Set

The Example 1 ink set (Ink Set 1) was evaluated for viscosity, curl, decap, and drip value. Specifically, the ink viscosity of each ink was found to be 3.57 cps for magenta, 3.21 cps for the cyan ink, and 3.11 cps for the yellow ink.

The curl average after 72 hours, as measured on a Domtar, was 8 mm for the magenta ink, 15 mm for the cyan ink, and 15 mm for the yellow ink. This measurement was based on printing a 300 dpi pixel image with 56 ng of cyan or magenta and 72 ng of yellow at an 8"×10" full area fill on Domtar paper, and measuring the distance each corner curled up away from a flat surface, and then averaging this distance over the four corners. Curl measurements of 8 to 15 mm after 72 hours is considered acceptable.

Regarding decap performance, as previously defined, the number of ink spits or ejections from the ink-jet printhead that was required to recover a good visible line after a three second decap was determined for each ink. For the magenta and the cyan inks, only 1 spit or ejection was required. For the yellow ink, only 2 spits or ejections was required to regain the ability to print the visible line.

Additionally, the noted inks in the ink set produce virtually no visible drip. More specifically, the drip values of cyan and yellow inks were zero, whereas the magenta ink, when measured with an X-rite spectrophotometer, was found to have 20 mOD units based on testing protocols defined herein. As acceptable drip values translate to acceptable waterfastness, and a value of less than about 30 mOD units is considered acceptable drip, the noted ink set can be said to have acceptable waterfastness performance.

Though data is provided with respect to Example 1, it is noted that Ink Sets 2-6 also perform favorably and similarly when compared to Ink Set 1.

It is also noted that any of the individual inks from any of the ink sets described above can be included with other inks of other ink sets to form additional unique ink sets. To illustrate by a single exemplary embodiment, the cyan ink of Example 1 can be combined with the yellow ink of Example 2 and the magenta ink of Example 3 to form a unique ink set. Other mixing and matching of inks from the various ink sets can be beneficial in certain circumstances. Alternatively, the cyan, magenta, yellow, and black inks can also be mixed and matched to form unique ink sets. In other words, the ink sets described in the above examples are for exemplary purposes only, and various combinations of inks can be used to generate unique ink sets in accordance with embodiments of the present disclosure.

While the invention has been described with reference to certain preferred embodiments, those skilled in the art will appreciate that various modifications, changes, omissions, and substitutions can be made without departing from the spirit of the invention. It is therefore intended that the invention be limited only by the scope of the appended claims.

What is claimed is:

1. An ink-jet ink set, comprising: a first aqueous ink including a magenta dye and a magenta pigment, the magenta dye having about 5 wt % or less solubility in water; a second aqueous ink including a cyan pigment and which is substantially free of a dye; and a third aqueous ink including a yellow pigment and which is substantially free of a dye, wherein each of the first, second and third inks independently include 2-pyrrolidone and an additional solvent selected from a glycol, a second pyrrolidone, and mixtures thereof; wherein the ink jet ink as a whole is free of fixer.

2. An ink-jet ink set as in claim 1, wherein one of the magenta pigment, the cyan pigment, and the yellow pigment includes a polymer-attached pigment.

3. An ink-jet ink set as in claim 1, wherein each of the magenta pigment, the cyan pigment, and the yellow pigment includes a polymer-attached pigment.

4. An ink-jet ink set as in claim 1, wherein the additional solvent for at least one of the first ink, the second ink, or the third ink is selected from the group consisting of 2-hydroxyethyl-2-pyrrolidone, 2-hydroxythyl-2-imidazolidone, tetraethylene glycol, tripropylene glycol, 1,6-hexanediol, and combinations thereof.

5. An ink-jet ink set as in claim 1, wherein the additional solvent for each of the first ink, the second ink, and the third ink includes 2-hydroxyethyl-2-pyrrolidone.

6. An ink-jet ink set as in claim 1, wherein each of the first ink, the second ink, and the third ink includes at least two additional solvents independently selected from the glycol and the second pyrrolidone.

7. An ink-jet ink set as in claim 1, wherein each of the first ink, the second ink, and the third ink includes at least three additional solvents independently selected from the glycol and the second pyrrolidone.

8. An ink-jet ink set as in claim 1, further comprising a fourth aqueous ink including a black pigment and which is substantially free of a dye and further comprises 2-pyrrolidone and an additional solvent selected from a glycol, a second pyrrolidone, and mixtures thereof.

9. An ink-jet ink set as in claim 1, wherein the magenta dye is a carboxy-dye.

10. A method of printing a multi-color image, comprising: warming a first ink with a precursor pulse, said first ink being substantially free of dye and including a non-magenta pigment, 2-pyrrolidone, and an additional solvent selected from a glycol, a second pyrrolidone, and mixtures thereof; ejecting the first ink from a first thermal ink-jet printhead onto a media substrate after warming the first ink; warming a second ink with a precursor pulse, said second ink including a magenta dye and a magenta pigment, the magenta dye having about 5 wt % or less solubility in water, 2-pyrrolidone, and an additional solvent selected from a glycol, a second pyrrolidone, and mixtures thereof; and ejecting a second ink from a second thermal ink-jet printhead onto the media substrate after warming the second ink, wherein the ink-jet ink as a whole is free of fixer.

11. A method as in claim 10, wherein the precursor pulse for the first ink and the second ink each has a temperature from about 35° C. and 65° C.

12. A method as in claim 10, further comprising the steps of: warming a third ink with a precursor pulse, said third ink including a non-magenta color pigment, 2-pyrrolidone, and an additional solvent selected from a glycol and a second pyrrolidone; and ejecting the third ink from a third thermal ink-jet printhead onto the media substrate after warming the third ink.

13. A method as in claim 10, wherein the additional solvent of the first ink includes at least two solvents selected from the group of 2-hydroxyethyl-2-pyrrolidone, 2-hydroxyethyl-2-imidazolidone, tetraethylene glycol, tripropylene glycol, 1,6-hexanediol, and combinations thereof.

14. A method as in claim 10, wherein the additional solvent of the second ink includes at least two solvents selected from the group of 2-hydroxyethyl-2-pyrrolidone, 2-hydroxyethyl-2-imidazolidone, tetraethylene glycol, tripropylene glycol, 1,6-hexanediol, and combinations thereof.

* * * * *

UNITED STATES PATENT AND TRADEMARK OFFICE
CERTIFICATE OF CORRECTION

PATENT NO. : 8,857,963 B2  
APPLICATION NO. : 12/990149  
DATED : October 14, 2014  
INVENTOR(S) : George Sarkisian et al.

It is certified that error appears in the above-identified patent and that said Letters Patent is hereby corrected as shown below:

In the Claims

In column 12, line 64, in Claim 1, delete "ink jet" and insert -- ink-jet --, therefor.

In column 13, line 7, in Claim 4, delete "2-hydroxythyl" and insert -- 2-hydroxyethyl --, therefor.

Signed and Sealed this  
Twenty-eighth Day of April, 2015

Michelle K. Lee  
*Director of the United States Patent and Trademark Office*